United States Patent
Lee et al.

(10) Patent No.: US 7,400,817 B2
(45) Date of Patent: Jul. 15, 2008

(54) LIGHT GUIDE MEMBER AND BACKLIGHT UNIT INCLUDING LIGHT GUIDE MEMBER AND METHODS OF FABRICATING LIGHT GUIDE MEMBERS AND BACKLIGHT UNITS

(75) Inventors: Dong Ho Lee, Ulsan-si (KR); Won Ki Cho, Yangsan-si (KR); Wan Soo Han, Hwaseong-si (KR); Ho Seok Ko, Suwon-si (KR); Sang Hoon Lee, Hwaseong-si (KR); Hee Chan Eum, Hwaseong-si (KR); Jong Kyo Jeong, Pyungtaek-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/727,055

(22) Filed: Mar. 23, 2007

(65) Prior Publication Data
US 2008/0025688 A1    Jan. 31, 2008

(30) Foreign Application Priority Data
Jul. 4, 2006    (KR) .................... 10-2006-0062732

(51) Int. Cl.
*G02B 6/10*    (2006.01)
*F21V 8/00*    (2006.01)
(52) U.S. Cl. .................. 385/146; 385/129; 362/612; 362/615
(58) Field of Classification Search .................. None
See application file for complete search history.

(56) References Cited

U.S. PATENT DOCUMENTS

| | | | |
|---|---|---|---|
| 4,373,282 A | 2/1983 | Wragg | |
| 5,506,924 A | 4/1996 | Inoue | |
| 6,364,497 B1* | 4/2002 | Park et al. | 362/627 |
| 6,467,922 B1 | 10/2002 | Blanc et al. | |
| 6,633,722 B1 | 10/2003 | Kohara et al. | |
| 6,755,546 B2* | 6/2004 | Ohkawa | 362/626 |
| 2003/0030764 A1 | 2/2003 | Lee | |
| 2003/0227768 A1* | 12/2003 | Hara et al. | 362/31 |
| 2005/0099815 A1 | 5/2005 | Kim et al. | |
| 2005/0196123 A1* | 9/2005 | Kumagai | 385/146 |
| 2006/0146227 A1* | 7/2006 | Park et al. | 349/64 |
| 2007/0024971 A1 | 2/2007 | Cassarly et al. | |

FOREIGN PATENT DOCUMENTS

| | | |
|---|---|---|
| DE | 197 31 142 A1 | 2/1999 |
| DE | 10 2004 026 585 A1 | 12/2005 |
| EP | 0 609 816 A2 | 8/1994 |
| JP | 2000-089033 | 3/2000 |
| JP | 2005-209558 | 8/2005 |
| JP | 2005-285586 | 10/2005 |
| KR | 10-2004-0082474 | 9/2004 |
| KR | 10-2005-0044961 A | 5/2005 |
| KR | 10-2005-0045187 | 5/2005 |
| WO | WO 2007/016282 A1 | 2/2007 |

\* cited by examiner

*Primary Examiner*—Tina M Wong
(74) *Attorney, Agent, or Firm*—Lee & Morse, P.C.

(57) ABSTRACT

A light guide member for guiding light received from a light source unit, the light source unit illuminating light toward the light guide member, the light guide member may include a plurality of first grooves on a first side of the light guide member, the first grooves extending along a first direction, and a plurality of first projections projecting from surfaces of the first grooves.

22 Claims, 9 Drawing Sheets

LIGHT GUIDE MEMBER AND BACKLIGHT UNIT INCLUDING LIGHT GUIDE MEMBER AND METHODS OF FABRICATING LIGHT GUIDE MEMBERS AND BACKLIGHT UNITS

BACKGROUND OF THE INVENTION

1. Field of the Invention

The invention relates to a light guide member and a backlight unit including a light guide member. More particularly, the invention relates to a light guide member for guiding light traveling therein and providing uniformly distributed light, and a backlight unit employing such a light guide member.

2. Description of the Related Art

A light guide member may be employed, e.g., by an illumination device of a display device, to receive light from a light source of the illumination device and guide the received light so as to provide light having a uniform luminance distribution to a display panel of the display device. For example, a flat panel display device, e.g., a liquid crystal display (LCD), may include an illumination device, e.g., a backlight unit (BLU), which may include a light guide member.

There is a demand for improved display devices in, e.g., the information and communication industries. More particularly, e.g., higher resolution, lighter, thinner, and/or less power consuming display devices are desired. One possible approach for developing such improved display devices is to provide thinner, lighter BLUs and/or improved light guide members capable of providing light having a more uniform luminance distribution.

For example, one type of flat panel display that is widely used today is thin film transistor-liquid crystal displays (TFT-LCDs). Such TFT-LCDs may include an LCD panel in which liquid crystal is provided between two substrates, a BLU as an illumination device positioned in a lower portion of the LCD panel, and an LCD drive IC (LDI) for driving the LCD panel. The BLU unit may include, e.g., a light source, a light guide member, and an optical sheet including a diffusion sheet and a prism sheet.

The light source may supply non-uniformly distributed linear light to the light guide member. Generally, the light guide member is to modify the non-uniformly distributed linear light and output planar light having a uniform optical distribution. However, conventional light guide members fall short of outputting uniformly distributed linear light. For example, portions of the light guide member arranged between, and in close proximity to, light sources of the illumination device may provide less light, i.e., appear darker, than portions of the light guide member arranged substantially along a zero-degree radiation angle of the respective light source.

More particularly, in general, as the radiation angle of light from the light source increases, a light intensity decreases. The diffusion of light is also generally weak at a portion of a light guide member close to the light source. Thus, e.g., at portions of the light guide member receiving light from the light source via relatively larger radiation angles and/or beyond a radiation angle of the light, the intensity of light output from the light guide member may not have a uniform luminance distribution. As a result of such non-uniformity, a luminance distribution of light from the light guide member may include a bright line, bright area and/or dark area close to the light source, i.e., a bright line/area effect. Such a bright line/area effect may be particularly prominent at portions of the light guide member that do not overlap with or are not aligned with light sources of a light source unit. When light having a non-uniform luminance distribution is provided to a display device, image quality of the display device may be hindered.

In view of such shortcomings of the light guide member, a BLU employing such light guide members may include a plurality of optical sheets, e.g., a diffusion sheet and a prism sheet, in an attempt to provide light having a more uniformly distributed luminance to the display device. However, having to provide additional optical sheets may increase, e.g., the cost, weight and/or size of the BLU.

SUMMARY OF THE INVENTION

It is an object of the invention to provide a light guide member and a backlight unit including such a light guide member, which substantially overcome one or more of the problems due to limitations and disadvantages of the related art.

It is therefore a feature of embodiments of the invention to provide a light guide member capable of guiding light to output light having a more uniform luminance distribution relative to conventional light guide members.

It is therefore a separate feature of embodiments of the invention to provide a BLU employing only a prism sheet as an optical member.

It is therefore a separate feature of embodiments of the invention to provide a light guide member capable of guiding light to output light having an entirely uniform luminous distribution.

It is therefore a separate feature of embodiments of the invention to provide a thinner and/or lighter BLU.

It is therefore a separate feature of embodiments of the invention to provide a backlight unit of an LCD device and a method for fabricating a light guide member of the same capable of improving an appearance and/or quality of the LCD device by providing light with an entirely uniform and high brightness.

It is therefore a separate feature of embodiments of the invention to provide a light guide member with which a distribution of light radiated from a light source may be changed using first grooves of the light guide member while simultaneously increasing a diffusion of the light using a plurality of projections of the light guide member such that light with a substantially or completely uniform luminance distribution and/or high brightness may be provided to, e.g., the display panel.

It is therefore a separate feature of embodiments of the invention to provide a method of forming a light guide member that may employ a bite to process a metal layer, which has a relatively lower hardness, and is formed on a mold core so as to reduce and/or prevent damage to the bite while precisely controlling a width and/or a depth of first and/or second grooves formed on the light guide member.

At least one of the above and other features and advantages of the invention may be realized by providing a light guide member for guiding light received from a light source unit, the light source unit illuminating light toward the light guide member, the light guide member including a plurality of first grooves on a first side of the light guide member, the first grooves extending along a first direction, and a plurality of first projections projecting from surfaces of the first grooves.

The light guide member may include a plurality of second grooves on a second side of the light guide member, wherein the second grooves may extend along a second direction substantially perpendicular to the first direction. The light guide member may include a plurality of second projections formed on surfaces of the second grooves. The second grooves may have a cross-section that is substantially V-shaped. The second grooves may have at least one of a depth of about 0.0005 mm to about 0.01 mm, a first face having an inclination angle of about 90° to about 120° and a second face having an inclination angle of about 30° to about 45°. The second grooves may be arranged at a pitch of about 0.01 mm to about 0.1 mm. The first direction may be substantially perpendicular to a zero-degree radiation angle of the light form the light source.

The first projections may have at least one of a dot-like projecting shape, a half-spherical hexahedron shape and a polygonal hexahedron shape. A density of the first projections per unit pixel may decrease approaching away from the light source such that a unit pixel closer to the light source may be associated with a higher density of the first projections than a unit pixel further away from the light source. The first projections may have a diameter of about 0.001 mm to about 0.1 mm and/or a height of about 0.001 mm to about 0.01 mm. The light guide member may include a resin.

The light guide member may include an acrylic resin and/ or a polycarbonate resin. The first projections may be non-uniformly disposed on the light guide member. The first grooves may have a depth of about 0.001 mm to about 0.01 mm, a first face having an inclination angle of about 0.5° to about 10° and/or a second face having an inclination angle of about 10° to about 30°. The first grooves may be arranged at a pitch of about 0.03 mm to about 0.3 mm. The first grooves may have a substantially V-like cross-sectional shape.

At least one of the above and other features and advantages of the invention may be realized by providing a backlight unit (BLU) of a display device including a display panel, the backlight unit including a light source, an optical member, and a light guide member arranged to receive light from the light source, the light guide member may include a plurality of first grooves on a first side of the light guide member, the first grooves extending along a first direction, and a plurality of first projections projecting from surfaces of the first grooves, wherein the light guide member may guide and/or provide the light received from the light source toward the optical member and the optical member may provide the light provided by the light guide member to a display panel of the display device.

The light source may include a cold cathode fluorescent tube and/or a LED. The BLU may include a reflective member for reflecting light incident thereon toward the light guide member, wherein the reflective member and the optical member may sandwich the light guide member therebetween. The optical member may include a prism sheet, which may include a plurality of grooves formed on a surface thereof.

At least one of the above and other features and advantages of the invention may be realized by providing a method of fabricating a light guide member for guiding light received from a light source, the light guide member including a plurality of first grooves on a first side of the light guide member, the first grooves extending along a first direction, and a plurality of first projections projecting from surfaces of the first grooves, the method may include forming a metal layer on a surface of a mold core, forming a first pattern including a shape opposite to a shape of the first grooves on the metal layer, fabricating a first mold including a second pattern with a shape opposite to a shape of the first pattern, forming a plurality of projection patterns on the surface of the first mold including the second pattern, fabricating a second mold including a third pattern with a shape opposite to a shape of the second pattern and a shape opposite to a shape of the plurality of projection patterns using the first mold, and molding one of a first groove or a second groove corresponding to the shape of the second pattern and the shape of the plurality of projection patterns using the second mold.

The metal layer may include at least one metal with a hardness lower than a hardness of the mold core. The metal layer may be formed by an electroless nickel plating method. The first pattern formed on the metal layer may be formed using a bite. The projection patterns of the first mold may be formed by a micro lens array process.

BRIEF DESCRIPTION OF THE DRAWINGS

The above and other features and advantages of the invention will become more apparent to those of ordinary skill in the art by describing in detail exemplary embodiments thereof with reference to the attached drawings in which.

DETAILED DESCRIPTION OF THE INVENTION

Figure 1:
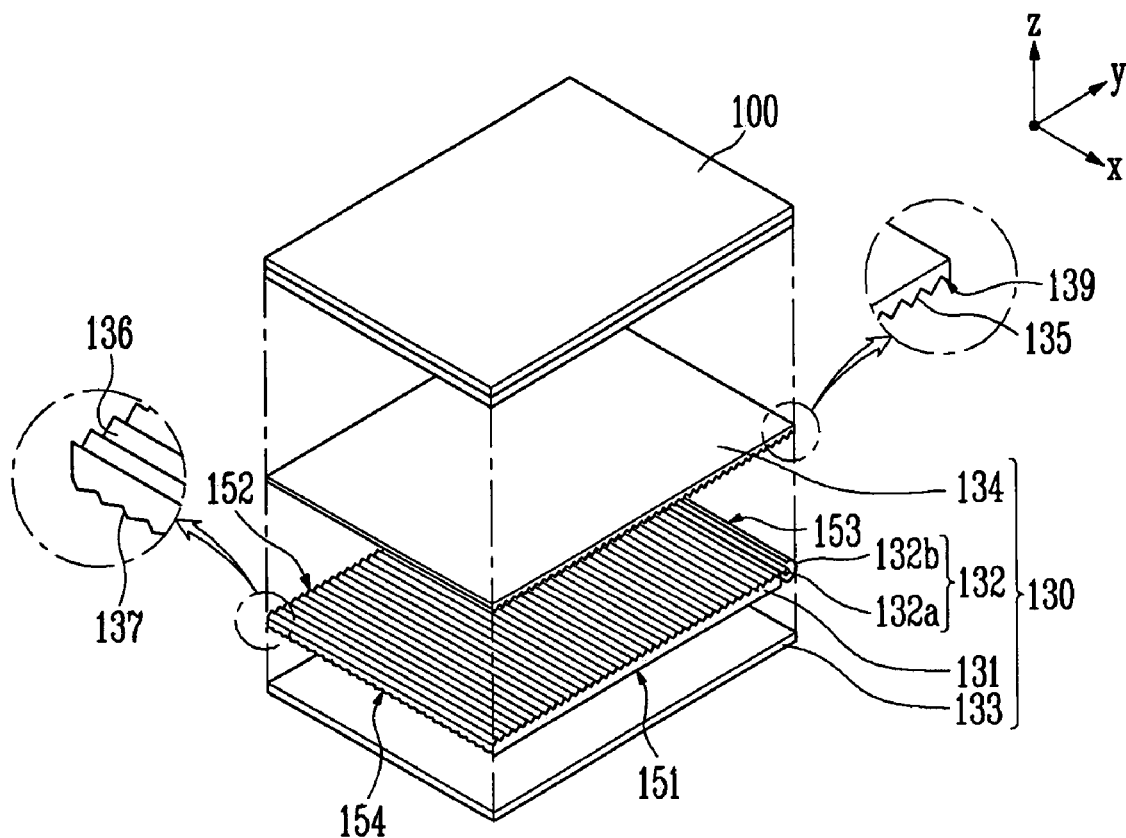
FIG. 1 illustrates an exploded perspective view of parts of an exemplary LCD device employing an exemplary embodiment of a backlight unit and a light guiding member according to one or more aspects of the invention.

Korean Patent Application No. 10-2006-0062732, filed on Jul. 4, 2006, in the Korean Intellectual Property Office, and entitled: "Backlight Unit of a Liquid Crystal Display Device and Method for Fabricating a Light guide member of the Same," is incorporated by reference herein in its entirety.

The invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. In the following description, references made to "first," "second," etc. merely serve to identify different elements and/or features of different elements and, unless specified otherwise, the features may or may not have the same values.

FIG. 1 illustrates an exploded perspective view of an exemplary liquid crystal display (LCD) device, as an exemplary device, employing an exemplary embodiment of a backlight and an exemplary embodiment of a light guiding member according to one or more aspects of the invention.

Referring to FIG. 1, an LCD device may include an LCD panel 100 and a BLU 130. The BLU 130 may provide light to the LCD panel 100 such that images may be displayed on the LCD panel 100.

The LCD panel 100 may include two substrates disposed opposite each other, a liquid crystal layer provided between the two substrates, and a pixel region (not shown) defined by, e.g., a plurality of gate lines and data lines arranged on the substrates in, e.g., a matrix-type manner. A thin film transistor and a pixel electrode may be formed at respective portions of one of the substrates corresponding to intersecting portions of the gate lines and data lines formed thereon (not shown). Each pixel electrode may be connected to the respective thin film transistor, and each thin film transistor may control signals respectively supplied to the respective pixel(s). A color filter (not shown) and a common electrode (not shown) may be formed on the other of the substrates. A polarizing film (not shown) may be provided on an outer side of each of the substrates.

The BLU 130 may include a light guide member 131, a light source unit 132, an optical member 134, and a reflective member 133. The light source unit 132 may supply light to the light guide member 131. The light guide member 131 may change a distribution of light provided from the light source unit 132. The reflective member 133 may reflect light received thereon back toward the LCD panel 100.

The optical member 134 may collect and reflect the light having a uniform luminance distribution, help enhance brightness of the display device and/or only allow light with a predetermined incident angle to pass through. For example, the optical member 134 may include a prism sheet that only allow substantially vertical light to pass through, while light having other incident angles may be reflected toward the reflective member 133 before being reflected back again toward the optical member 134 until the light vertically passes through the optical member 134 toward the LCD panel 100.

The light guide member 131 may change a distribution of light concentrated on a plurality of small areas thereof, and may thereby, provide uniform light over a relatively larger area corresponding to, e.g., the plurality of small areas and/or an entire area of, e.g., the second side of the light guide member. The light guide member 131 may have a thin-plate-like shape, e.g., cuboid shape. The light guide member 131 may include, e.g., transparent resin such as, e.g., acryl or polycarbonate, etc.

The light guide member 131 may include a first side 151, a second side 152, a third side 153, and a fourth side 154. The first side 151 and the second side 152 may oppose each other, and the third side 153 and the fourth side 154 may oppose each other. More particularly, the third side 153 and the fourth side 154 may extend between and connect respective portions of the first side 151 and the second side 152 together. The first side 151, e.g., reflective side, of the light guide member 131 may face the reflective member 133 of the BLU 130, and the second side 152, e.g., exit side, of the light guide member 131 may face the optical member 134.

The light source unit 132 may include one or more light sources 132a disposed on one or more sides, e.g., the third side 153, of the light guide member 131 and one or more reflective panels 132b reflecting light radiated from the light source(s) 132a back toward the light guide member 131. A point light source, such as a light emitting diode (LED) light-emitting white light may be used as the light source 132a, and one or more light sources may be arranged depending on a size of the light guide member 131. A BLU may employ, e.g., a cold cathode fluorescent lamp (CCFL) and/or an LED as a light source 132a. CCFLs may generally be employed in BLUs for larger-sized display devices, and LEDs may generally be employed in BLUs for smaller-sized display devices.

In the exemplary embodiment of the BLU illustrated, the light sources 132a are arranged on a single side, i.e., the third side 153, of the light guide member. That is, in embodiments of the invention, the light guide member 131 may only receive light from one side, e.g., the third side 153 of the light guide member 131. However, embodiments of the invention are not limited to such an arrangement.

The optical member 134 may include a prism sheet. In embodiments of the invention, the optical member 134 may only include a prism sheet. In embodiments of the invention, the optical member 134 may not include a diffusion sheet. Referring to FIG. 1, the optical member 134 may include one or more grooves 135 formed on a side 139 facing the light guide member 131. The prism sheet of the optical member 134 may help improve the vertical directionality of the light by diffusing and collecting light incident from the light guide member 131 in a vertical direction toward, e.g., the LCD panel 100.

The light guide member may include first grooves 136 and/or second grooves 137. The first grooves 136 may extend along a first direction, e.g., x-direction, on the first side 151 of the light guide member 131. The first direction may be substantially perpendicular to a zero-degrees radiation angle of light emitted from the light source 132a of the BLU 130. The second grooves 137 may extend along a second direction, e.g., y-direction, on the second side 152 of the light guide member 131. The second direction may be substantially parallel to the zero-degrees radiation angle of light emitted from the light source 132a of the BLU 130. The first grooves 136 and the second grooves 137 may extend along directions that are substantially orthogonal to each other. When light is provided to one or more sides, e.g., the third side 153, of the light guide member 131, an optical path and distribution of the received light may be changed by the first and second grooves 136, 137.

The first grooves 136 and/or the second grooves 137 may be substantially V-shaped grooves. More particularly, in embodiments of the invention, irrespective of a depth and/or a width of the first grooves 136 and/or the second grooves 137, a cross-sectional shape of the first grooves 136 and/or the second grooves 137 may be substantially V-shaped, as taken along a line extending along the second direction and the first direction, respectively. Embodiments of the invention are not limited to such structures. For example, in embodiments of the invention, the first grooves 136 may be formed on the second side 152 of the light guide member 131, and the second grooves 137 may be formed on the first side 151 of the light guide member 131.

In embodiments of the invention, projections 138 may be formed on one more sides of the light guide member 131. For example, in embodiments of the invention, the projections 138 may be formed on one of the first grooves 136 or the second grooves 137. The projections 138 may have various patterns, e.g., dot-like projecting patterns, half-spherical hexahedron patterns, polygonal hexahedron patterns, etc.

Figure 2A:
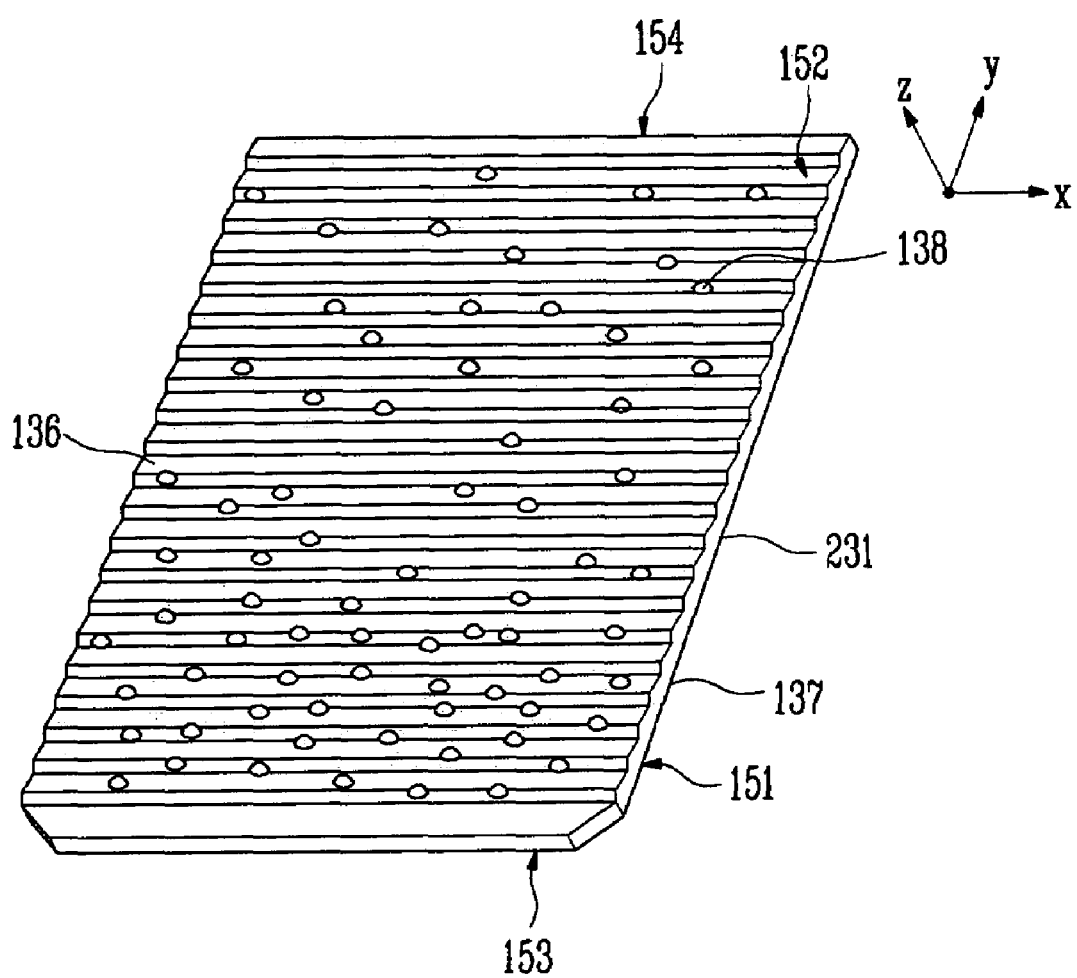
FIG. 2A and FIG. 2B illustrate top perspective views of a first and a second exemplary embodiment, respectively, of a light guide member according to one or more aspects of the invention.

FIG. 2A illustrates a top perspective view of a first exemplary embodiment of a light guide member 231 according to one or more aspects of the invention. In the exemplary embodiment illustrated in FIG. 2A, the light guide member 231 may include a plurality of the first grooves 136 on the second side 152 of the light guide member 231, a plurality of the second grooves 137 on the first side 151 of the light guide member 231, and a plurality of the projections 138 on the first grooves 136.

Figure 2B:
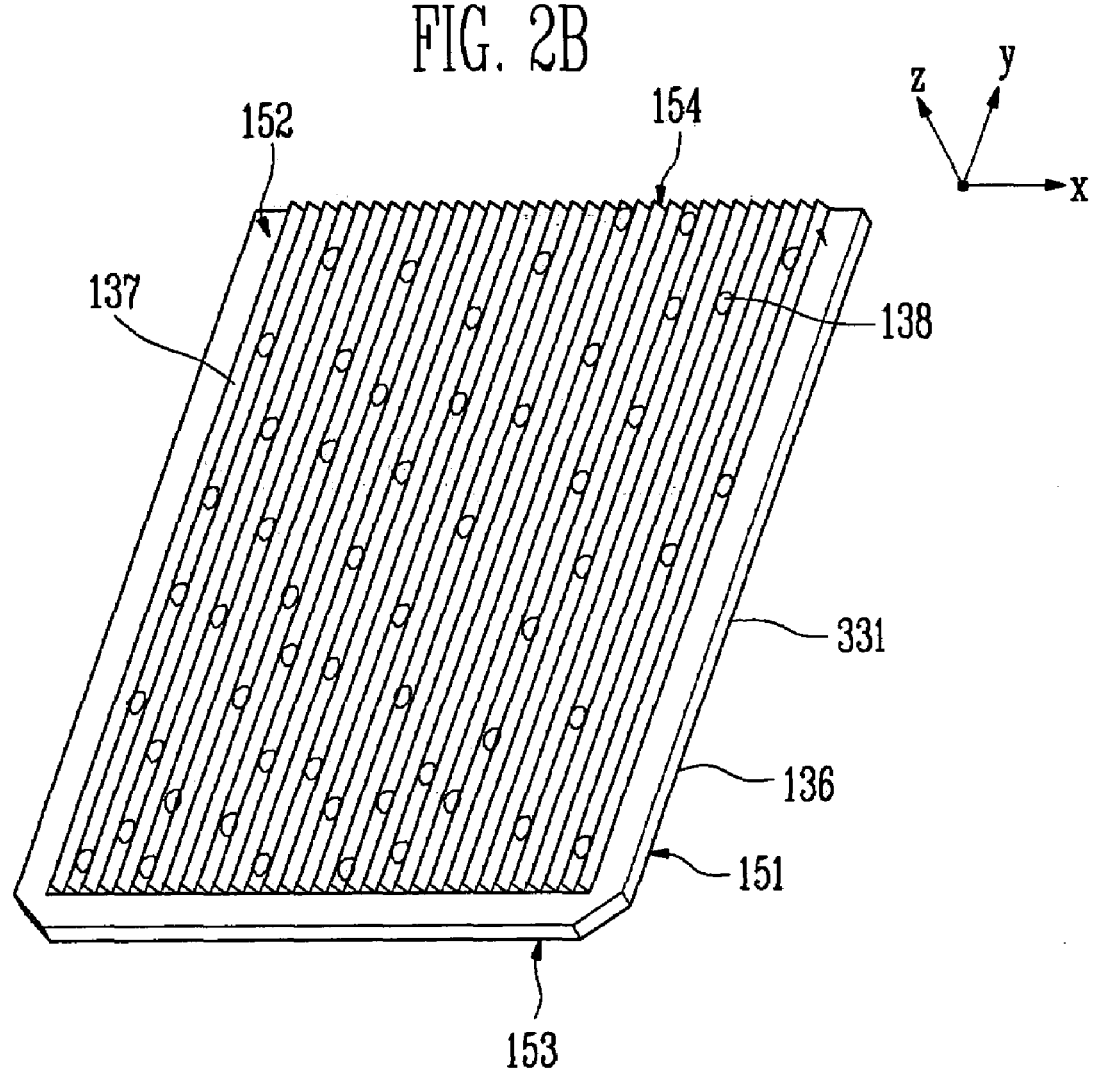

FIG. 2B illustrates a top perspective view of a second exemplary embodiment of a light guide member 331 according to one or more aspects of the invention. In the exemplary embodiment illustrated in FIG. 2B, the light guide member 331 may include a plurality of the first grooves 136 on the first side 151 of the light guide member 331, a plurality of the second grooves 137 on the second side 152 of the light guide member 331, and a plurality of the projections 138 on the second grooves 137.

Figure 2C:
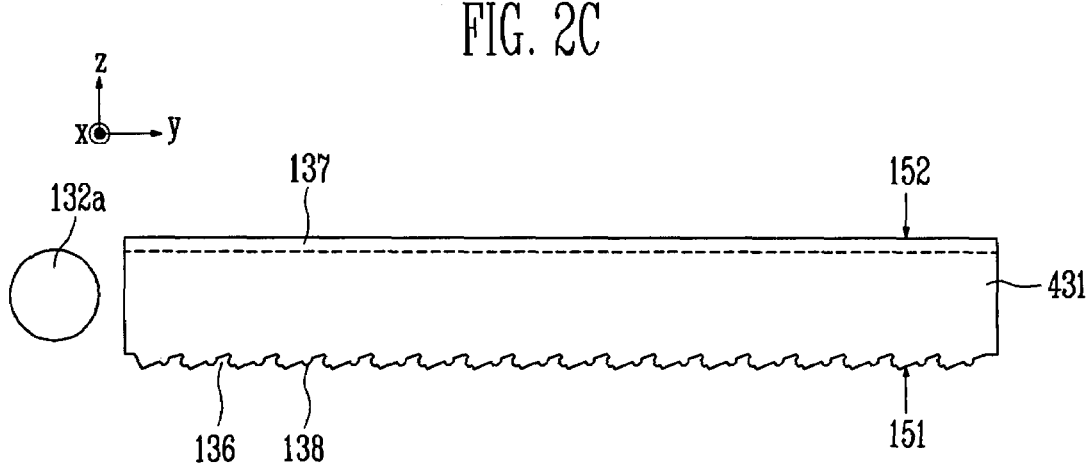
FIG. 2C illustrates a cross-sectional view of a third exemplary embodiment of a light guide member and light source illustrated in FIG. 1, as taken along the y-direction.

FIG. 2C illustrates a cross-sectional view of a third exemplary embodiment of a light guide member 431 and light source illustrated in FIG. 1, as taken along the y-direction. In the exemplary embodiment illustrated in FIG. 2C, the light guide member 431 may include a plurality of the second grooves 137 on the second side 152 of the light guide member 431, a plurality of the first grooves on the first side 151 of the light guide member 431, and a plurality of the projections 138 on the first grooves 136.

Figure 3A:
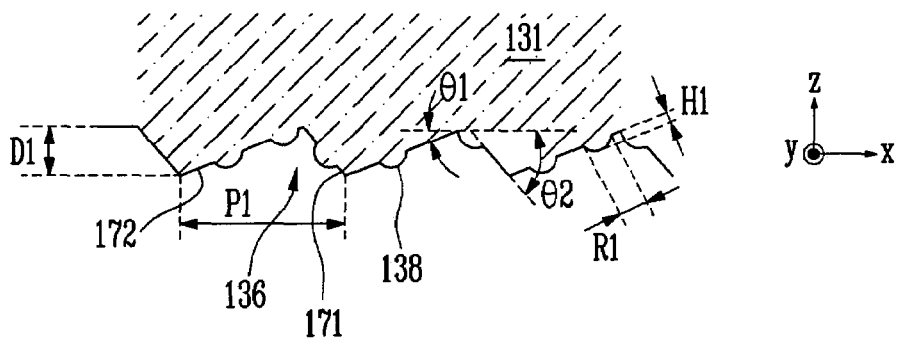
FIG. 3A illustrates a partial cross-sectional view of a portion of the exemplary embodiment of the light guide member, taken along the x-direction, including an exemplary embodiment of the first grooves including projections formed thereon.

FIG. 3A illustrates a partial cross-sectional view of a portion of an exemplary embodiment of the light guide member, taken along the x-direction, including an exemplary embodiment of the first grooves including projections formed thereon. In embodiments of the light guide member in which the first grooves 136 may extend along the first direction, e.g., x-direction, and the projections 138 may project from the first grooves 136, as shown, e.g., in FIG. 3A, the first grooves 136 may be formed to have a pitch P1 of about 0.03 mm to about 0.3 mm, a depth D1 of about 0.001 mm to about 0.01 mm, a front angle θ1 of 0.5° to about 10°, and a rear angle θ2 of about 10° to about 30°. The projections 138 may have a first height H1 of about 0.001 mm and/or a first diameter R1 of about 0.005 mm to about 0.05 mm.

Figure 3B:
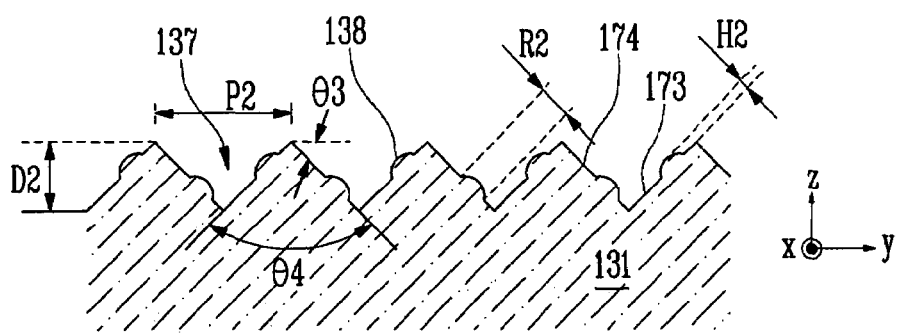
FIG. 3B illustrates a partial cross-sectional view of a portion of the exemplary embodiment of the light guide member, taken along the y-direction, including an exemplary embodiment of the second grooves including projections formed thereon.

FIG. 3B illustrates a partial cross-sectional view of a portion of an exemplary embodiment of the light guide member, taken along the y-direction, including an exemplary embodiment of the second grooves including projections formed thereon. In embodiments of the invention in which the second grooves 137 may extend along the second direction, e.g., y-direction, and the projections 138 may project from the second grooves 137, as shown, e.g., in FIG. 3B, the second grooves 137 may be formed to have a pitch P2 of about 0.01 mm to about 0.1 mm, a depth D2 of about 0.0005 mm to about 0.01 mm, a left and right angle θ3 of about 90° to about 120°, and a vertical angle θ4 of about 90° to about 120°. The projections 138 may have a second height H2 of about 0.001 mm to about 0.1 mm and/or a second diameter R2 of about 0.005 mm to about 0.05 mm.

The projections 138 may be arranged on, e.g., surfaces 171, 172, 173, 174 of the first and/or second grooves 136, 137 and/or a surface of the light guide member, e.g., 131, 231, 331, 431, in a non-uniform pitch. Unless specified otherwise, descriptions of features may apply to any of the exemplary embodiments of the light guide member, e.g., 131, 231, 331, 431. In embodiments of the invention, the projections 138 may arranged such that a number of the projections 138 per unit pixel may decrease, approaching away from the light source unit 132, i.e., approaching away from the third side 153 of the light guide member, e.g., 131, 231, 331, 431.

In embodiments of the invention, the projections 138 may be arranged one the first side 151 and/or second side 152 of the light guide member 131 according to, e.g., a relationship expressed in Equation 1 below.

$$CS = (DS + MI) \times 10 \text{ (unit: mm)} \quad \text{[Equation 1]}$$

where CS may be a size of the unit pixel (square), DS may be size (R) of the projection 138, and MI may be minimum distance between the projections 138.

Figure 4:
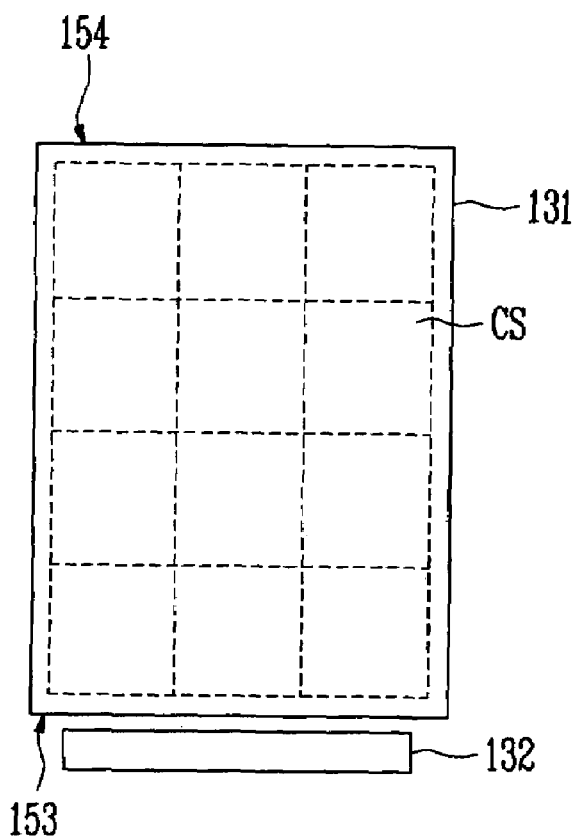
FIG. 4 illustrates a plan view of an array.

Referring to FIG. 4, e.g., it is assumed that a size CS of the unit pixel is 0.6×0.6 mm, a size DS of the projection 138 is 0.05 mm, and a minimum distance MI between the projections 138 is 0.01 mm. For a unit pixel having a 10% density, 10 projections 138 may be arranged, while maintaining the minimum distance MI between the projections 138. For a unit pixel having a 100% density, 100 projections 138 may be arranged, while maintaining the minimum distance MI between the projections 138.

Figure 5:
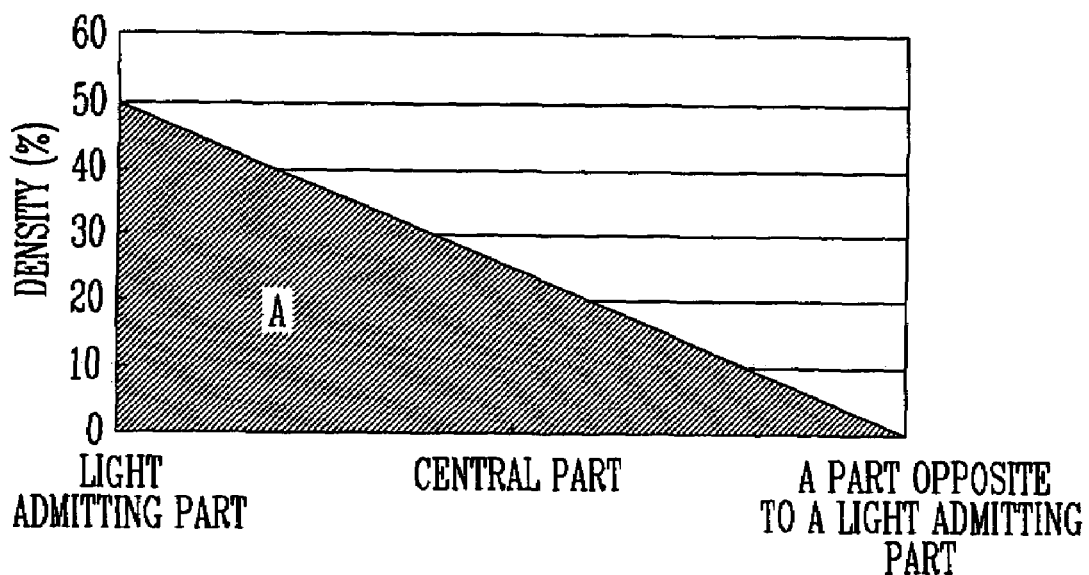
FIG. 5 illustrates a graph of a general relationship between a density of projections formed on respective portions of a light guide member based on a distance of the respective portion from a light source unit.

FIG. 5 illustrates a graph of a general relationship between a density of projections formed on respective portions of a light guide member based on a distance of the respective portion from a light source unit. As illustrated in FIG. 5, the density of the projections 138 may be about 50% or less at a portion of the light guide member 131 close to the light source unit 132, i.e., a light admitting portion, and may be arranged at or about 0% at a portion of the light guide member 131 far from the light source unit 132, e.g., opposite to the light admitting portion. Thus, in embodiments of the invention, a density of the projections 138 may decrease approaching away from the light source unit 132, i.e., approaching away from the third side 153 of the light guide member 131. The change in the density of the projections 138 may be represented as a non-linear curve within a region A illustrated in FIG. 5.

An exemplary operation of a light guide member 131 is described below with reference to FIG. 1. Light may be emitted from the light source unit 132 toward the light guide member 131. For example, the light from the light source unit 132a may be emitted toward the first side 151 of the light guide member 131. The light form the light source unit 132 may then be guided and provided to the LCD panel 100 via the light guide member 131 employing one or more aspects of the invention.

The light radiated from the light source 132a may be incident into the inside of the light guide member 131 via an incidence face, e.g., third side 153 of the light guide member 131. The light radiated from the light source unit 132 may be incident at an intensity that depends on the radiation angle of the light.

A portion of the incident light may be emitted to the second side 152 of the light guide member 131 by the first and/or second grooves 136, 137. Other portions of the light may progress inside of the light guide member 131 and/or exit from the first side 151 of the light guide member 131 before being eventually guided toward the optical member 134.

An outgoing angle of the light exiting the light guide member 131 may be guided by, e.g., the first and/or the second grooves 136, 137 and/or the projections 138 so that the light may be collected, provided and/or guided in a constant or substantially constant direction, and may have a substantially uniform and/or completely uniform luminance distribution. That is, in embodiments of the invention, the first grooves 136 and/or the second grooves 137 enable light to be collected in a constant direction while the projections 138 enable the incident light to be simultaneously substantially or completely scattered by the projections 138 so that the distribution of the light exiting the light guide member, e.g., provided to the optical member 134 may be substantially and/or completely uniform.

Other portions of the incident light may be emitted toward the first side 151 of the light guide member 131, and may exit from, e.g., the first side 151 of the light guide member 131 before being reflected by the reflective member 133 and directed toward the light guide member 131. The light reflected by the reflective member 133 may then exit the second side 152 of the light guide member 131, while maintaining the uniform and/or substantially uniform luminance distribution and the substantially constant and/or constant direction of the exiting light. The light uniformly and/or substantially uniformly distributed in a constant or substantially constant direction may be emitted from, e.g., the second side 152 of the light guide member 131 to the prism sheet of the optical member 134. The light may then be uniformly and/or substantially uniformly emitted along a third direction, e.g., z direction, to a surface, e.g., entire surface, of the LCD panel 100 via, e.g., the groove(s) 135 of the prism sheet of the optical member 134.

Figure 6:
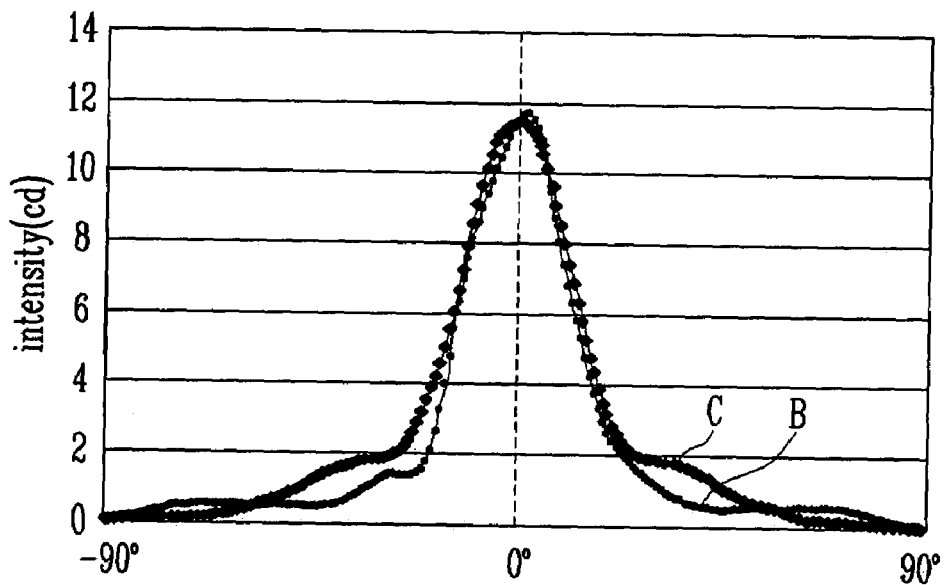
FIG. 6 illustrates a graph of a relationship between light intensity and a viewing angle of an LCD device comprising a backlight unit according to one or more aspects of the invention.

FIG. 6 illustrates a graph of a relationship between light intensity and a viewing angle of an LCD device comprising a backlight unit according to one or more aspects of the invention. Referring to FIG. 6, curve C represents the intensities measured from an LCD device employing one or more aspects of the invention, while curve B represents the intensities measured from an LCD device employing a convention backlight unit and/or light guide member. By comparing curves A and B, it may be appreciated that a contrast dependent on the viewing angle is improved in the LCD device employing one or more aspects of the invention.

Exemplary embodiments of methods of fabricating the light guide member, e.g., 131, employing one or more aspects of the invention will be described below. FIGS. 7A to FIG. 7F illustrate sectional views of resulting structures obtained during a first exemplary embodiment of method of fabricating a light guide member according to one or more aspects of the invention.

Figure 7A:
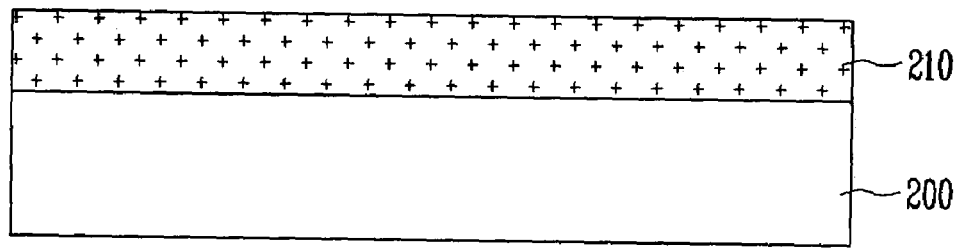
FIG. 7A to FIG. 7F illustrate sectional views of resulting structures obtained during a first exemplary embodiment of method of fabricating a light guide member according to one or more aspects of the invention.

Referring to FIG. 7A, a mold core 200 including, e.g., a metal(s) with a relatively high hardness, e.g., Stavax or Sus, etc., may be prepared. A metal layer 210 including, e.g., a metal(s) with a hardness lower than that of the mold core 200, e.g., nickel, may be formed on a surface of the mold core 200. The metal layer 210 may have a thickness of about 0.05 mm to about 0.2 mm. The metal layer 210 may be formed using, e.g., an electroless nickel plating method.

Figure 7B:
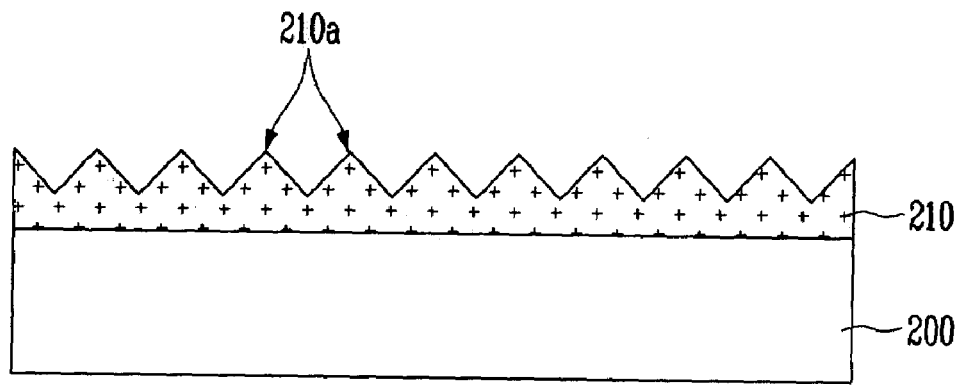

Referring to FIG. 7B, a first pattern 210a may be formed on the metal layer 210. The first pattern 210a may have a shape opposite to a shape of the first and/or second grooves 136, 137. The first pattern 210a may be formed using, e.g., a bite (not shown), which may be made of, e.g., diamond, etc. Thus, the pattern 210a may be formed to have a shape substantially or completely opposite to the a shape of each of the first grooves 136 and/or the second grooves 137, such as, e.g., a shape of the first grooves 136 and the second grooves 137 illustrated in FIGS. 3A and 3B. For example, the first pattern 210a may have a size corresponding to the depths D1 and D2 of the pitches P1 and P2 and the angles θ1, θ2, θ3, and θ4 described above.

Figure 7C:
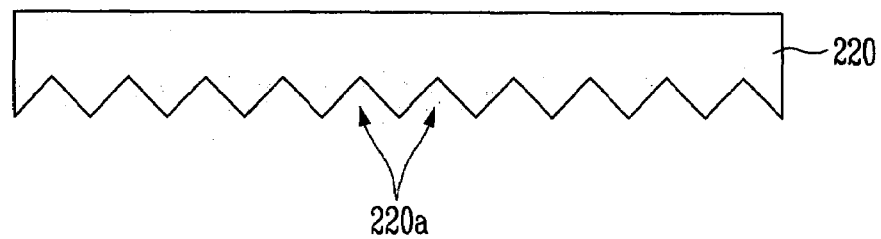

Referring to FIG. 7C, a first stamper 220 including a second pattern 220a with a shape opposite to the first pattern 210a is fabricated using the first pattern 210a formed on the metal layer 210.

Figure 7D:
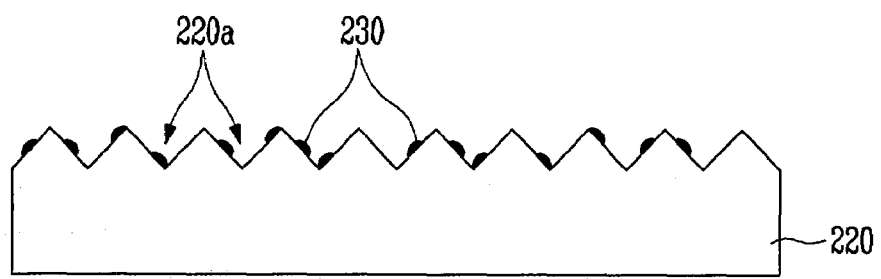

Referring to FIG. 7D, on the surface of the first stamper 220 including the second pattern 220a, a plurality of first projection patterns 230 may be formed. The first projection patterns 230 may be formed using, e.g., a micro lens array (MLA) process, etc., which may be applied to a fabricating process of a semiconductor device.

That is, e.g., on the surface of the first stamper 220 on which the second pattern 220a may be formed, a photoresist may be formed. The photoresist may then be exposed and/or developed using a predetermined mask to form a photoresist projection pattern. The photoresist projection pattern may then be formed into the first projection pattern 230 in, e.g., a half-spherical form, using, e.g., a reflow process.

Figure 7E:
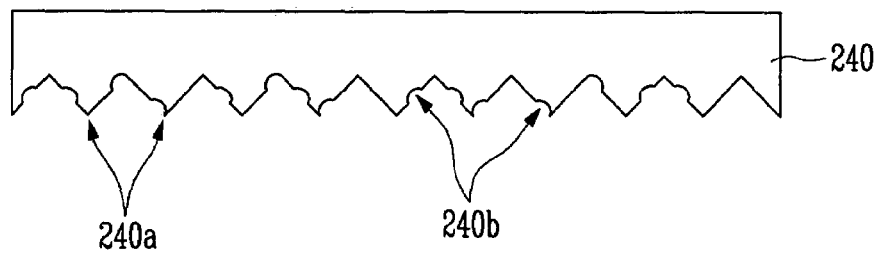

Referring to FIG. 7E, a second stamper 240, including a third pattern 240a with a shape opposite to the second pattern 220a and a second projection pattern 240b with a shape opposite to the first projection pattern 230, may be fabricated using, e.g., the first stamper 220 shown in FIG. 7D.

Figure 7F:
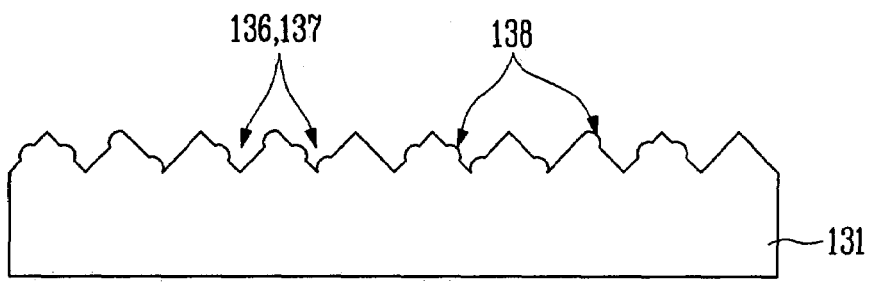

Referring to FIG. 7F, using a molding method and the second stamper 240 illustrated in FIG. 7E, a plurality of first or second grooves 136, 137 including projections 138 may be formed on a surface of the light guide member 131, which may have a shape of a thin cuboid and may include a transparent resin, e.g., acryl or polycarbonate, etc. As discussed above, the first or second grooves may have a shape corresponding to the third pattern 240a and the second projection pattern 240b, which may be formed on the second stamper 240.

FIG. 8A to FIG. 8D illustrate sectional views for of resulting structures obtained during a second exemplary embodiment of fabricating a light guide member according to one or more aspects of the invention.

Figure 8A:
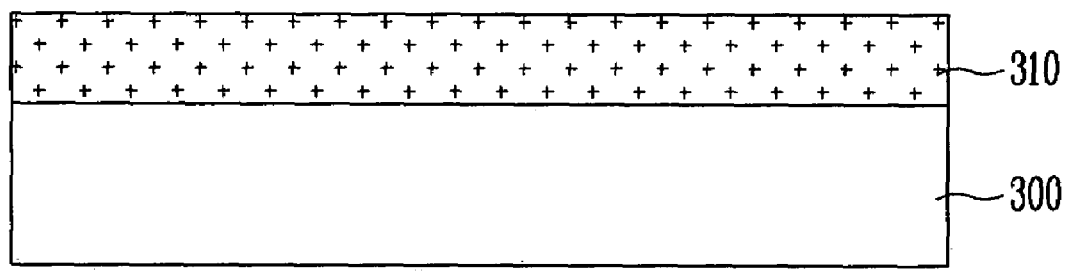
FIG. 8A to FIG. 8D illustrate sectional views for of resulting structures obtained during a second exemplary embodiment of fabricating a light guide member according to one or more aspects of the invention.

Referring to FIG. 8A, a mold core 300 including, e.g., a metal(s) with a relatively high hardness, e.g., Stavax or Sus, etc., may be prepared. A metal layer 310 including, e.g., a metal(s) with hardness lower than that of the mold core 300, e.g., nickel, may then be formed on a surface of the mold core 300. The metal layer 310 may have a thickness of about 0.05 mm to about 0.2 mm. The metal layer 310 may be formed using, e.g., an electroless nickel plating method.

Figure 8B:
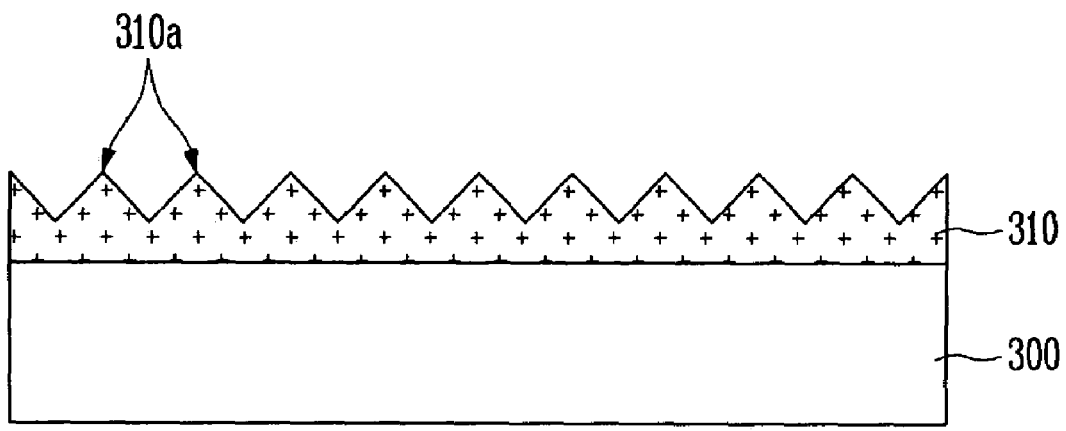

Referring to FIG. 8B, an opposite pattern 310a may be formed on the metal layer 310. The opposite pattern 310a may have, e.g., a shape opposite to the V-grooves 136 or 137 by a processing method using a bite (not shown), which may be made of, e.g., diamond, etc. Thus, the opposite pattern 310a may have a shape substantially or completely opposite to the a shape of each of the first grooves 136 and/or the second grooves 137, such as, e.g., a shape of the first grooves 136 and the second grooves 137 illustrated in FIGS. 3A and 3B. For example, the opposite pattern 310a may have a size corresponding to the depths D1 and D2 of the pitches P1 and P2 and the angles θ1, θ2, θ3, and θ4 described above.

Figure 8C:
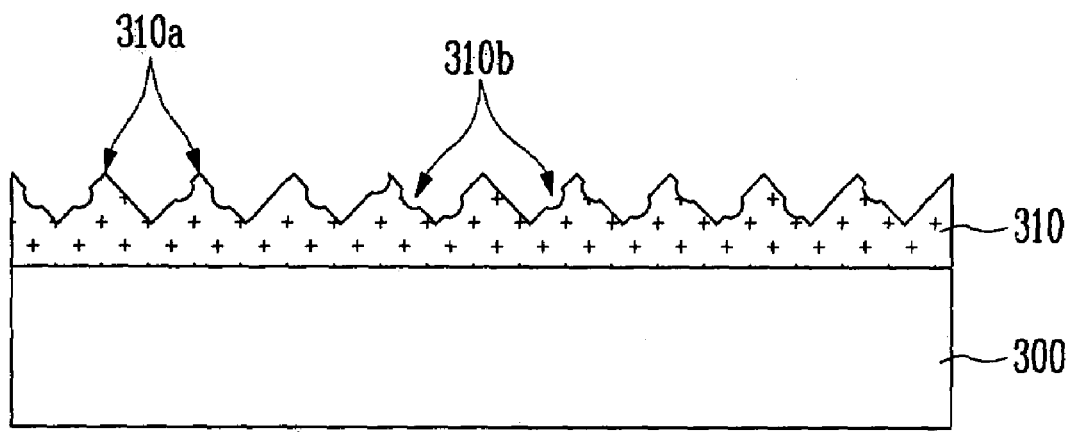

Referring to FIG. 8C, on a surface of the metal layer 310 on which the opposite pattern 310a may be formed, a plurality of opposite projection patterns 310b may be formed. The opposite projection patterns 310b may be formed by, e.g., etching the metal layer 310 or melting the respective portion of the metal layer 310 with a solid-state laser, etc.

Figure 8D:
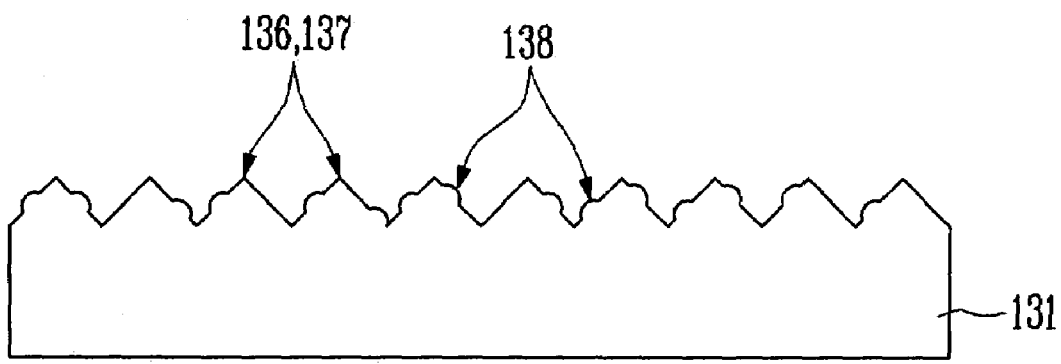

Referring to FIG. 8D, on the surface of the light guide member 131, which may have, e.g., a shape of a thin cuboid and may include a transparent resin, e.g., acryl or polycarbonate, etc., a plurality of the first or second grooves 136 or 137 may be formed. The first or second grooves 136, 137 may have a shape opposite to a shape of the opposite pattern 310a and the projections 138 may have a shape opposite to a shape of the opposite projection pattern 310b. Thus, the first and/or second grooves 136, 137 may be formed using, e.g., a molding method employing the metal layer 310 including the opposite pattern 310a and opposite projection pattern 310b, as shown in FIG. 8C.

When directly processing the mold cores 200, 300 including a metal(s) having a relatively high hardness with the bite, the bite can be damaged due as a result of the hardness of the mold cores 200 and 300. In embodiments of the invention, the metal layers 210 and 310 having a relatively lower hardness may be formed on the surface of the mold cores 200, 300, and the bite may be used to process the metal layer 210, 310, thereby reducing and/or preventing damage to the bite and precisely controlling a width and/or a depth of the first and second grooves 136, 137.

A size of the first grooves 136 extending, e.g., along the first direction, e.g., x-direction, a size of the second grooves 137 extending, e.g., along the second direction, e.g., y-direction and/or a size of the projections 138 may be determined by the descriptions of FIGS. 3A, 3B, 4 and 5, as well as Equation 1. Although the exemplary embodiments of the method of forming the light guide member 131, as described above only specifically describe forming first or second grooves 136, 137 including the projections 138 on one side of the light guide member, formation of the other of the first or second grooves 136, 137 may be formed, with or without the projections 180, on the other side of the light guide member 131, by employing one or more aspects of the exemplary methods described above with reference to FIGS. 7A-7B and 8A-8D.

Although exemplary embodiments of the light guide member and the backlight unit may be described in relation to an exemplary LCD device, embodiments of the invention are not limited to use with an LCD device. Further, although reference is made to a "backlight unit" as an exemplary illumination device, such units are generally called "backlight" units because they may be arranged behind the display panel. However, aspects of the invention are not limited to such arrangements and/or uses.

Exemplary embodiments of the invention have been disclosed herein, and although specific terms are employed, they are used and are to be interpreted in a generic and descriptive sense only and not for purpose of limitation. For example, while V-grooves have been illustrated in embodiments of the invention, a relationship between a number, size and/or relationship of first projections relative to the first grooves may be more important to than the shape of the groove itself. While a V-groove may be the most efficient manner to realize the patterns, the grooves may be curved, and/or have a flat base, rather than have a V-shape. Accordingly, it will be understood by those of ordinary skill in the art that various changes in form and details may be made without departing from the spirit and scope of the invention as set forth in the following claims.

What is claimed is:

1. A light guide member for guiding light received from a light source unit, the light source unit illuminating light toward the light guide member, the light guide member comprising:
   a plurality of first grooves on a first side of the light guide member, the first grooves extending along a first direction; and
   a plurality of first projections projecting from surfaces of the first grooves, the first projections being non-uniformly disposed on the light guide member.

2. The light guide member as claimed in claim 1, further comprising a plurality of second grooves on a second side of the light guide member, the second grooves extending along a second direction substantially perpendicular to the first direction.

3. The light guide member as claimed in claim 2, further comprising a plurality of second projections formed on surfaces of the second grooves.

4. The light guide member as claimed in claim 2, wherein the second grooves have a cross-section that is substantially V-shaped.

5. The light guide member as claimed in claim 2, wherein the second grooves have at least one of a depth of about 0.0005 mm to about 0.01 mm, a first face having an inclination angle of about 90° to about 120° and a second face having an inclination angle of about 30° to about 45°.

6. The light guide member as claimed in claim 2, wherein the second grooves are arranged at a pitch of about 0.01 mm to about 0.1 mm.

7. The light guide member as claimed in claim 1, wherein the first direction is substantially perpendicular to a zero-degree radiation angle of the light form the light source.

8. The light guide member as claimed in claim 1, wherein the first projections have at least one of a dot-like projecting shape, a half-spherical hexahedron shape and a polygonal hexahedron shape.

9. The light guide member as claimed in claim 1, wherein the first projections have at least one of a diameter of about 0.001 mm to about 0.1 mm and a height of about 0.001 mm to about 0.01 mm.

10. The light guide member as claimed in claim 1, wherein the light guide member includes a resin.

11. The light guide member as claimed in claim 1, wherein the light guide member includes an acrylic resin and/or a polycarbonate resin.

12. The light guide member as claimed in claim 1, wherein the first grooves have at least one of a depth of about 0.001 mm to about 0.01 mm, a first face having an inclination angle of about 0.5° to about 10° and a second face having an inclination angle of about 10° to about 30°.

13. The light guide member as claimed in claim 1, wherein the first grooves are arranged at a pitch of about 0.03 mm to about 0.3 mm.

14. The light guide member as claimed in claim 1, wherein the first grooves have a substantially V-like cross-sectional shape.

15. The light guide member as claimed in claim 1, wherein a density of the first projections decreases away from the light source unit.

16. The light guide member as claimed in claim 15, wherein the density of the first projections per unit pixel decreases away from the light source such that a unit pixel closer to the light source is associated with a higher density of the first projections than a unit pixel further away from the light source.

17. The backlight unit (BLU) of a display device including a display panel, the backlight unit comprising:
- a light source; and
- a light guide member arranged to receive light from the light source, the light guide member including:
  - a plurality of first grooves on a first side of the light guide member, the first grooves extending along a first direction, and
  - a plurality of first projections projecting from surfaces of the first grooves, the first projections being non-uniformly disposed on the light guide member,
- wherein the light guide member guides and provides the light received from the light source toward a display panel of the display device.

18. The BLU as claimed in claim 17, wherein the light source includes a cold cathode fluorescent tube and/or a LED.

19. The BLU as claimed in claim 17, further comprising an optical member, the optical member directing light from the light guide member to the display panel.

20. The BLU as claimed in claim 19, further comprising a reflective member for reflecting light incident thereon toward the light guide member, the reflective member and the optical member sandwiching the light guide member therebetween.

21. The BLU as claimed in claim 19, wherein the optical member includes a prism sheet including a plurality of grooves formed on a surface thereof.

22. The BLU as claimed in claim 17, wherein a density of the first projections decreases away from the light source.

* * * * *